(12) United States Patent
Ohno et al.

(10) Patent No.: US 7,851,396 B2
(45) Date of Patent: Dec. 14, 2010

(54) POROUS SINTERED BODY, METHOD OF MANUFACTURING POROUS SINTERED BODY, AND METHOD OF MANUFACTURING EXHAUST GAS PURIFYING APPARATUS

(75) Inventors: Kazushige Ohno, Ibigun (JP); Masafumi Kuneda, Ibigun (JP); Yuki Fujita, Ibigun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 608 days.

(21) Appl. No.: 11/683,698

(22) Filed: Mar. 8, 2007

(65) Prior Publication Data
US 2007/0293392 A1 Dec. 20, 2007

(30) Foreign Application Priority Data

Mar. 31, 2006 (JP) ............................. 2006-100410
Feb. 27, 2007 (JP) ............................. 2007-047945

(51) Int. Cl.
*B01J 27/224* (2006.01)
*B32B 3/12* (2006.01)
*B32B 3/28* (2006.01)
*B32B 3/30* (2006.01)
*B32B 7/08* (2006.01)
*C04B 35/52* (2006.01)
*B28B 1/00* (2006.01)
*B28B 3/00* (2006.01)
*B32B 5/00* (2006.01)
*C04B 33/32* (2006.01)
*C04B 33/36* (2006.01)
*C04B 35/64* (2006.01)

(52) U.S. Cl. ..................... 502/178; 428/116; 428/186; 428/323; 501/88; 264/630; 264/382

(58) Field of Classification Search ................ 502/178; 428/116, 188, 323; 501/88; 264/630, 382
See application file for complete search history.

(56) References Cited

U.S. PATENT DOCUMENTS 4,980,104 A * 12/1990 Kawasaki ............... 264/664

(Continued)

FOREIGN PATENT DOCUMENTS

CN          1717271 A          1/2006

(Continued)

OTHER PUBLICATIONS

European Search Report, 07290361.0—2104, mailed Aug. 16, 2007.

*Primary Examiner*—Patricia L Hailey
(74) *Attorney, Agent, or Firm*—Ditthavong Mori & Steiner, P.C.

(57) ABSTRACT

A method of manufacturing a porous sintered body includes mixing first silicon carbide particles, second silicon carbide particles, and a pore forming material having an average particle diameter Y μm to obtain a molding material. The first silicon carbide particles have an average particle diameter X μm larger than an average particle diameter of the second silicon carbide particles. Relationships $15 \leq X$, $0.5 \cdot X \leq Z \leq 0.9 \cdot X$, and $0.8 \cdot Z \leq Y \leq 1.8 \cdot Z$ are satisfied, wherein Z μm is an average pore diameter of the porous sintered body no less than 10 μm and no greater than 20 μm. The molding material is molded into a molded body. The molded body is degreased to eliminate the pore forming material from the molded body.

16 Claims, 8 Drawing Sheets

U.S. PATENT DOCUMENTS

| | | | |
|---|---|---|---|
| 6,815,038 B2 * | 11/2004 | Morimoto et al. | 428/116 |
| 7,037,477 B2 * | 5/2006 | Tomita et al. | 423/345 |
| 7,396,586 B2 | 7/2008 | Ohno et al. | |
| 7,449,427 B2 * | 11/2008 | Ohno et al. | 502/439 |
| 7,491,674 B2 * | 2/2009 | Fujii et al. | 502/340 |
| 7,556,666 B2 * | 7/2009 | Kunieda | 55/523 |
| 2003/0110744 A1 * | 6/2003 | Gadkaree et al. | 55/523 |
| 2004/0033175 A1 | 2/2004 | Ohno et al. | |
| 2004/0161596 A1 | 8/2004 | Taoka et al. | |
| 2005/0175514 A1 * | 8/2005 | Ohno | 422/177 |
| 2006/0021310 A1 | 2/2006 | Ohno et al. | |
| 2006/0051556 A1 | 3/2006 | Ohno et al. | |
| 2006/0093784 A1 | 5/2006 | Komori et al. | |
| 2006/0210765 A1 | 9/2006 | Ohno et al. | |
| 2006/0230732 A1 | 10/2006 | Kunieda | |
| 2006/0254231 A1 | 11/2006 | Hayashi et al. | |
| 2007/0128405 A1 | 6/2007 | Sakaguchi et al. | |
| 2007/0172632 A1 | 7/2007 | Ohno et al. | |
| 2007/0178275 A1 | 8/2007 | Takahashi | |
| 2007/0196620 A1 | 8/2007 | Ohno et al. | |
| 2008/0120950 A1 | 5/2008 | Ohno et al. | |
| 2008/0136062 A1 | 6/2008 | Kasai et al. | |
| 2008/0174039 A1 | 7/2008 | Saijo et al. | |
| 2008/0197544 A1 | 8/2008 | Saijo et al. | |
| 2008/0211127 A1 | 9/2008 | Naruse et al. | |
| 2008/0213485 A1 | 9/2008 | Shibata | |
| 2008/0236115 A1 | 10/2008 | Sakashita | |
| 2008/0236724 A1 | 10/2008 | Higuchi | |
| 2008/0237942 A1 | 10/2008 | Takamatsu | |
| 2008/0241015 A1 | 10/2008 | Kudo et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0107879 A1 | 4/2009 | Otsuka et al. | |
| 2009/0130378 A1 | 5/2009 | Imaeda et al. | |

FOREIGN PATENT DOCUMENTS

| | | | |
|---|---|---|---|
| EP | 1 338 322 | | 8/2003 |
| EP | 1 403 231 | | 3/2004 |
| EP | 1 707 251 | | 4/2006 |
| EP | 1 703 096 | | 9/2006 |
| EP | 1 710 015 | | 10/2006 |
| EP | 1 776 994 | | 4/2007 |
| EP | 1 787 968 | | 5/2007 |
| EP | 1 787 969 | | 5/2007 |
| JP | 04-187578 | * | 7/1992 |
| JP | 09-052780 | * | 2/1997 |
| JP | 2000-016872 | * | 1/2000 |
| JP | 2006-255574 | | 9/2006 |
| JP | 2006-289237 | | 10/2006 |
| JP | 2007-137726 | * | 6/2007 |
| WO | WO02-26351 | | 4/2002 |
| WO | WO02-096827 | | 12/2002 |
| WO | WO2006-035645 | | 4/2006 |
| WO | WO2006-070504 | | 7/2006 |
| WO | WO2007-058007 | | 5/2007 |

* cited by examiner

BACKGROUND ART

POROUS SINTERED BODY, METHOD OF MANUFACTURING POROUS SINTERED BODY, AND METHOD OF MANUFACTURING EXHAUST GAS PURIFYING APPARATUS

CROSS-REFERENCE TO RELATED APPLICATIONS

The present application claims priority under 35 U.S.C. §119 to Japanese Patent Application No. 2006-100410, filed Mar. 31, 2006, entitled "HONEYCOMB STRUCTURAL BODY AND METHOD OF MANUFACTURING THE SAME," and Japanese Patent Application No. 2007-047945, filed Feb. 27, 2007, entitled "HONEYCOMB STRUCTURAL BODY AND METHOD OF MANUFACTURING THE SAME." The contents of these applications are incorporated herein by reference in their entirety.

BACKGROUND OF THE INVENTION

1. Field of the Invention

The present invention relates to a porous sintered body, a method of manufacturing a porous sintered body, and a method of manufacturing an exhaust gas purifying apparatus.

2. Discussion of the Background

In recent years and continuing, there is a problem in which particulates contained in exhaust gas of internal combustion engines of various vehicles (e.g. buses, trucks) and machinery (e.g. construction machinery) adversely affect the environment and the human body.

Accordingly, there are proposed various honeycomb structural bodies formed of porous silicon carbide material for use as a filter that purifies exhaust gas by collecting particulates contained in the exhaust gas of internal combustion engines. One example is a filter having a honeycomb structural body including numerous porous pillar-shaped cells partitioned by cell walls and extending in a longitudinal direction. Since each cell of the honeycomb structural body has one of its ends sealed with a sealing material, the exhaust gas guided into the honeycomb structural body can only be discharged out of the honeycomb structural body by passing through the cell walls of the honeycomb structural body. The particulates or the like contained in the exhaust gas are collected when the exhaust gas passes through the cell walls. Furthermore, since harmful gas components contained in the exhaust gas (e.g. CO, HC, and NOx) can be purified by a catalyst reaction, there is another proposed example in which the foregoing honeycomb structural body has catalyst carried by its cell walls.

It is to be noted that (the cell walls of) the foregoing honeycomb structural body has a high porosity (for example, 45-60%). This is due to the fact that a low porosity increases the amount of damage caused by pressure when the exhaust gas flows through the honeycomb structural body. This applies, particularly, to a honeycomb structural body carrying a large amount of catalyst since a part of the pores of the cell walls may become clogged when the catalyst is carried in the cell walls. Thus, a higher porosity is desired.

In order to attain a honeycomb structural body having a high porosity, PCT International Publication No. 2002-096827 discloses a method of fabricating a honeycomb structural body by adding a pore forming material to a ceramic particle raw material beforehand and eliminating the pore forming material during a sintering process. The contents of this publication are incorporated by reference in their entirety.

However, in the case of adding a pore forming material to a ceramic particle material and conducting a sintering process, the obtained honeycomb structural body exhibits a pore diameter distribution C having a broad peak as shown in FIG. 1. This is because the pore diameter distribution C illustrates the total sum of a pore diameter distribution A obtained under the same conditions where a ceramic particle raw material without a pore forming material is sintered and a pore diameter distribution B obtained where pores are formed by a pore forming material. With a honeycomb structural body exhibiting a pore diameter distribution as C in FIG. 1, reduction of collection efficiency cannot be prevented even when the average pore diameter is controlled within a desired range.

In order to prevent such a problem, PCT International Publication 2002-026351 discloses a method of narrowing the obtained pore distribution by matching the particle diameter of the pore forming material with the pore diameter of the final product obtained after sintering only the ceramic particle raw material such that the pore distribution B obtained where pores are formed by the pore forming material after the sintering process is matched with the pore distribution A where a ceramic particle raw material is sintered. The contents of this publication are incorporated by reference in their entirety.

SUMMARY OF THE INVENTION

According to one aspect of the present invention, a method of manufacturing a porous sintered body includes mixing first silicon carbide particles, second silicon carbide particles, and a pore forming material having an average particle diameter Y μm to obtain a molding material. The first silicon carbide particles have an average particle diameter X μm larger than an average particle diameter of the second silicon carbide particles. Relationships $15 \leq X$, $0.5 \cdot X \leq Z \leq 0.9 \cdot X$, and $0.8 \cdot Z \leq Y \leq 1.8 \cdot Z$ are satisfied, wherein Z μm is an average pore diameter of the porous sintered body no less than 10 μm and no greater than 20 μm. The molding material is molded into a molded body. The molded body is degreased to eliminate the pore forming material from the molded body.

According to another aspect of the present invention, a porous sintered body includes a body made by molding a molding material. The molding material includes a pore forming material having an average particle diameter Y μm, first silicon carbide particles having an average particle diameter X, and second silicon carbide particles having an average particle diameter smaller than the average particle diameter X. Relationships $15 \leq X$, $0.5 \cdot X \leq Z \leq 0.9 \cdot X$, and $0.8 \cdot Z \leq Y \leq 1.8 \cdot Z$ are satisfied, wherein Z μm is an average pore diameter of the porous sintered body no less than 10 μm and no greater than 20 μm.

According to further aspect of the present invention, a method of manufacturing an exhaust gas purifying apparatus includes mixing first silicon carbide particles, second silicon carbide particles, and a pore forming material having an average particle diameter Y μm to obtain a molding material. The first silicon carbide particles have an average particle diameter X μm larger than an average particle diameter of the second silicon carbide particles. Relationships $15 \leq X$, $0.5 \cdot X \leq Z \leq 0.9 \cdot X$, and $0.8 \cdot Z \leq Y \leq 1.8 \cdot Z$ are satisfied, wherein Z μm is an average pore diameter of the porous sintered body no less than 10 μm and no greater than 20 μpm. The molding material is molded into a molded body. The molded body is degreased to eliminate the pore forming material from the molded body. The degreased molded body is sintered to form a porous sintered body. The porous sintered body is provided in a casing of the exhaust gas purifying apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
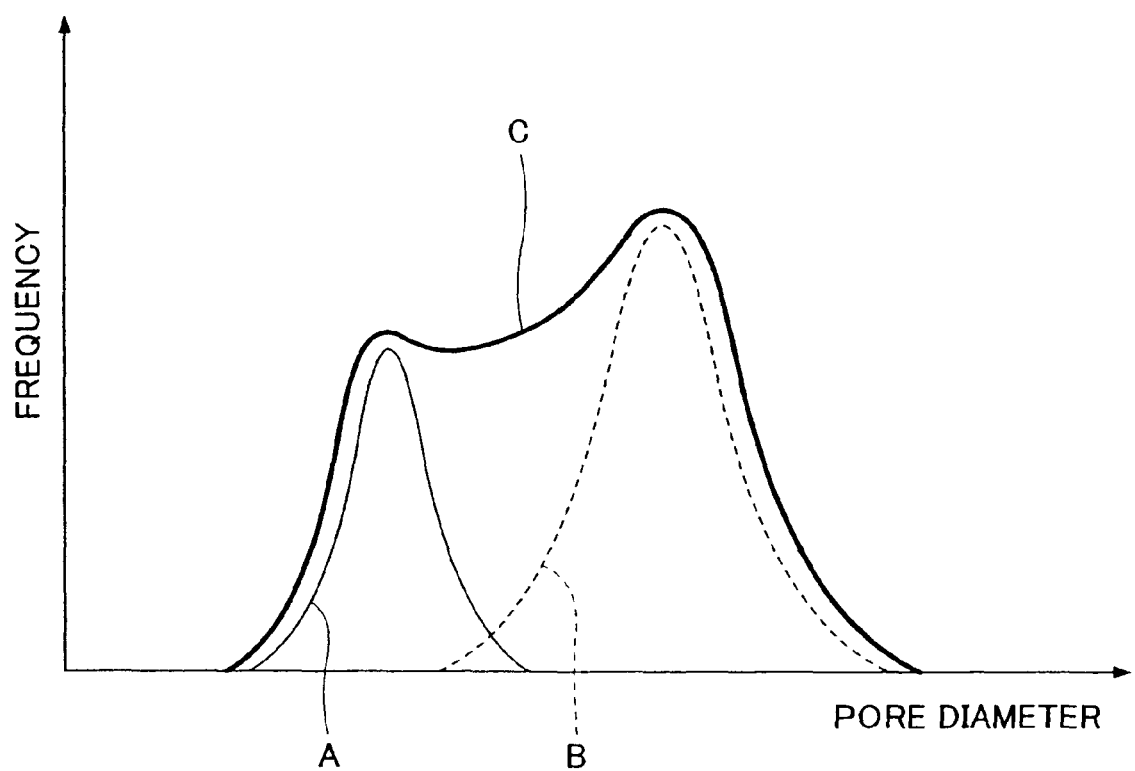
FIG. 1 is a graph schematically showing a pore diameter distribution of a honeycomb structural body of a background art.

The embodiments will now be described with reference to the accompanying drawings, wherein like reference numerals designate corresponding or identical elements throughout the various drawings.

It is to be noted that the average particle diameter of the type of silicon carbide particles having an average particle diameter greater than that of the other type of silicon carbide particles (hereinafter referred to as "coarse-grained silicon carbide particles") or the average particle diameter of the pore forming material, for example, are measured values that are obtained by using a laser diffraction/scattering method.

In general, when a pore forming material is added to silicon carbide particles (which is the raw material of the honeycomb structural body) and the materials are sintered for increasing the porosity of the honeycomb structural body to approximately 45-60%, the pore diameter of the fabricated honeycomb structural body exhibits a broad pore diameter distribution as shown in FIG. 1. With this kind of pore diameter distribution, the pores having relatively large diameters cause the collection efficiency of the honeycomb structural body to be reduced.

In order to solve the problem, it is known that by using a molded body obtained from a raw material including silicon carbide particles and a pore forming material where the average particle diameter AD of the silicon carbide particles is matched to the average particle diameter Y of the pore forming material and sintering the molded body at a high temperature for a sufficient amount of time, the obtained average pore diameter of the sintered porous molded body can be substantially equal to the average particle diameter AD of the silicon carbide particles and a sharp pore diameter distribution can be attained.

However, with this method, the sintering process is to be conducted in a condition where the molded body is completely sintered so as to prevent pores of various pore diameters from being created after the sintering process. That is, the sintering process is to be conducted for a long time in a case where the sintering temperature is constant and conducted under high temperature in a case where the sintering time is constant. In a case where the molded body is not completely sintered, the position of the peak of the pore diameters of the pores obtained by sintering the silicon carbide particles deviates from the position of the peak of the pore diameters of the pores obtained by the pore forming material. As a result, the distribution of the pore diameter becomes broad. Therefore, the foregoing method, which requires the sintering process to be conducted for an extensive time at a high temperature, causes the efficiency for manufacturing the honeycomb structural body to be reduced.

Meanwhile, according to an embodiment of one aspect of the present invention, a method of manufacturing a porous sintered body includes mixing first silicon carbide particles, second silicon carbide particles, and a pore forming material having an average particle diameter Y μm to obtain a molding material. The first silicon carbide particles have an average particle diameter X μm larger than an average particle diameter of the second silicon carbide particles. The following relationships $$15 \leq X,$$

$$0.5 \cdot X \leq Z \leq 0.9 \cdot X, \text{ and}$$

$$0.8 \cdot Z \leq Y \leq 1.8 \cdot Z$$

are satisfied, wherein Z μm is an average pore diameter of the porous sintered body no less than 10 μm and no greater than 20 μm.

In above-described conventional method, the average pore diameter Z of a sintered honeycomb structural body becomes equal to the average particle diameter AD of the coarse-grained silicon carbide particles (Z=AD) since the honeycomb structural body is completely sintered. Meanwhile, the embodiment of the present invention does not require silicon carbide particles to be thoroughly sintered as in the conventional method since the average pore diameter Z of the honeycomb structural body of the present invention satisfies at least a relationship of $Z \leq 0.9 \cdot X$. Thus, the embodiment of the present invention can obtain a honeycomb structural body in a shorter amount of time and/or at a lower temperature compared to that of the conventional method. In addition to selecting the average particle diameter of the coarse-grained silicon carbide particles to satisfy the foregoing relationship, the peaks of pore diameter distribution can be overlapped (described below) by selecting the average particle diameter Y of the pore forming material to satisfy a relationship of $0.8 \cdot Z \leq Y \leq 1.8 \cdot Z$. Thereby, a honeycomb structural body having a desired average pore diameter Z (10-20μm) and a sharp pore diameter distribution can be efficiently manufactured. It is to be noted that, in a case where Z satisfies a relationship of $0.5 \cdot X > Z$, the sintering of coarse-grained carbide particles becomes insufficient and overlapped peaks cannot be attained even if the average particle diameter of the pore forming material satisfies the above-described relationship. Furthermore, the strength of the honeycomb structural body may also be insufficient. Therefore, the average particle diameter X of the coarse-grained silicon carbide particles is desired to satisfy the relationship of $0.5 \cdot X \leq Z$.

Hence, in a case where exhaust gas flows through a honeycomb structural body having a sharp pore diameter distribution such as an embodiment of the present invention, all of the pores of the honeycomb structural body can effectively function to collect particulates and the like. As a result, the efficiency for collecting particulates and the like can be improved.

Next, embodiments of the present invention are described in further detail with reference to the accompanying drawings.

Figure 2:
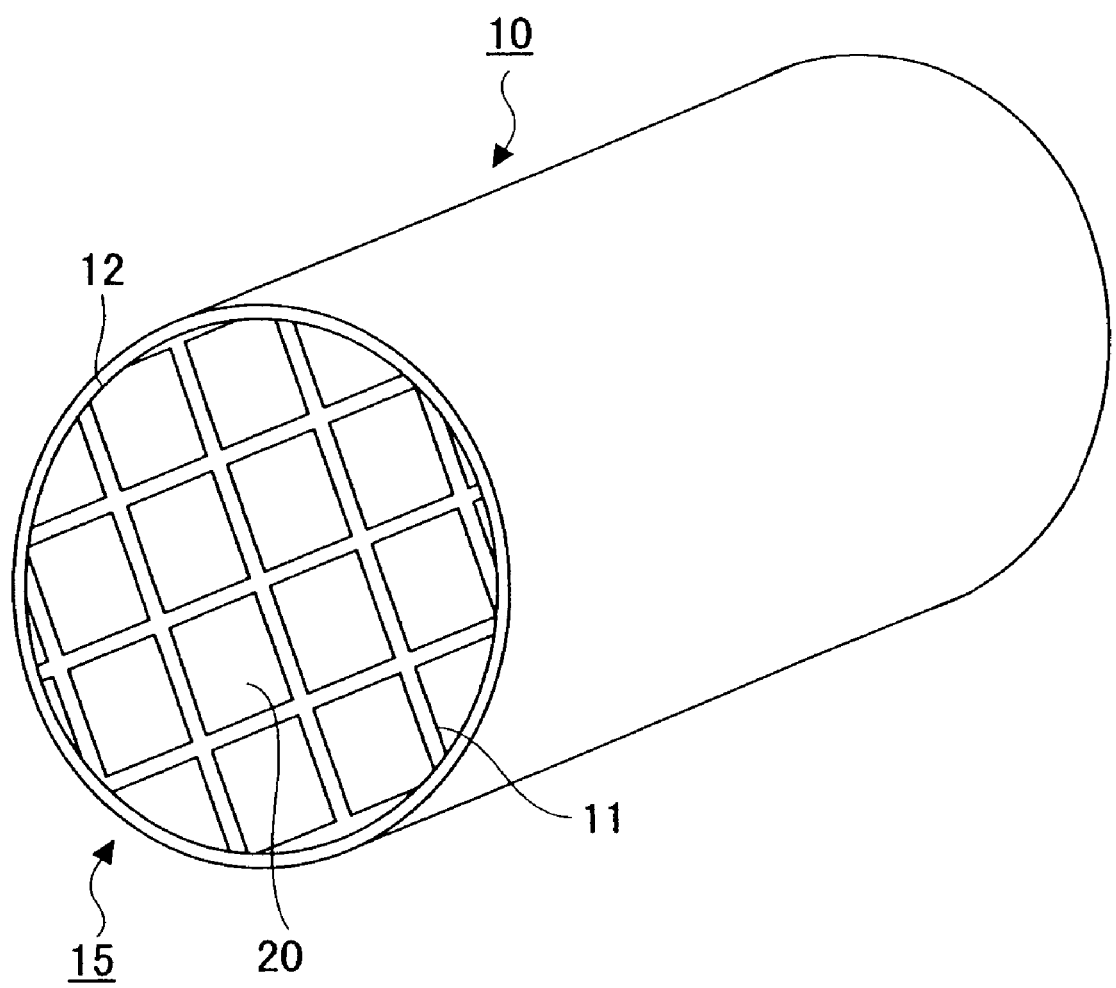
FIG. 2 is a perspective view schematically showing a honeycomb structural body according to an embodiment of the present invention.
Figure 3:
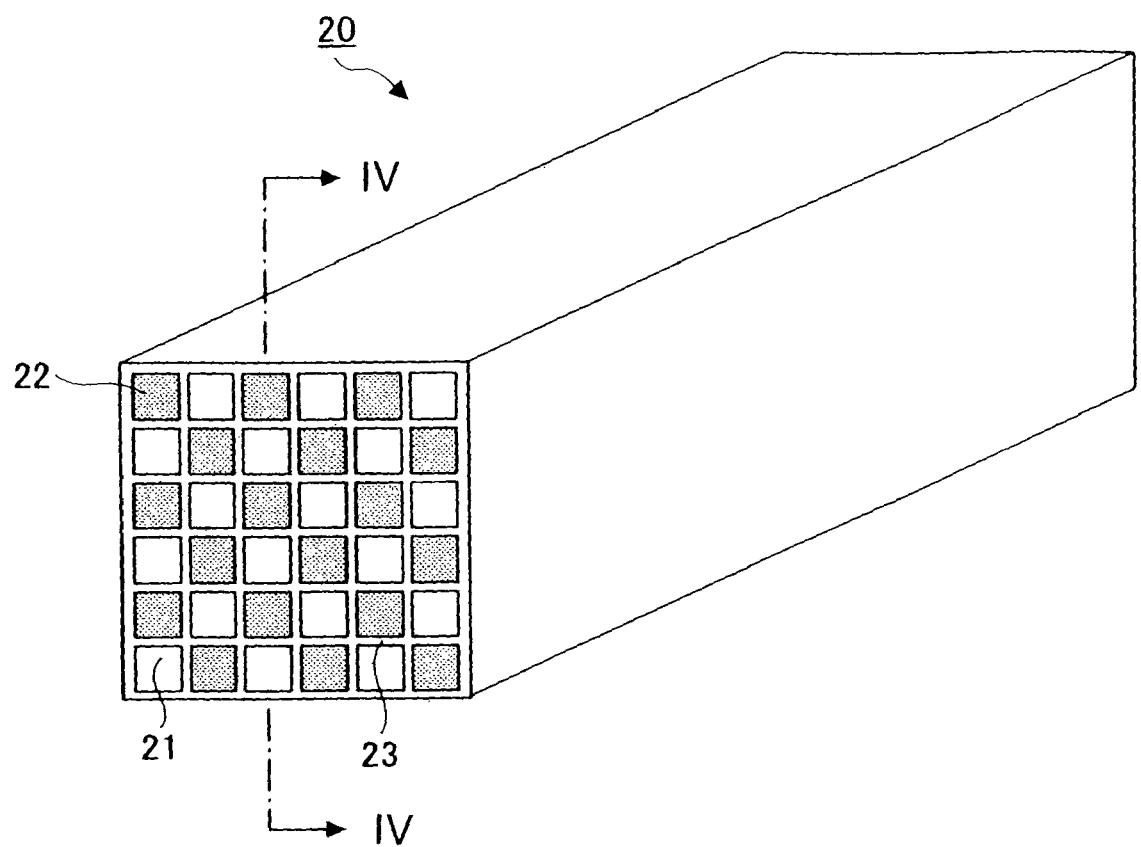
FIG. 3 is a perspective view schematically showing a porous silicon carbide member included in a honeycomb structural body according to an embodiment of the present invention.
Figure 4:
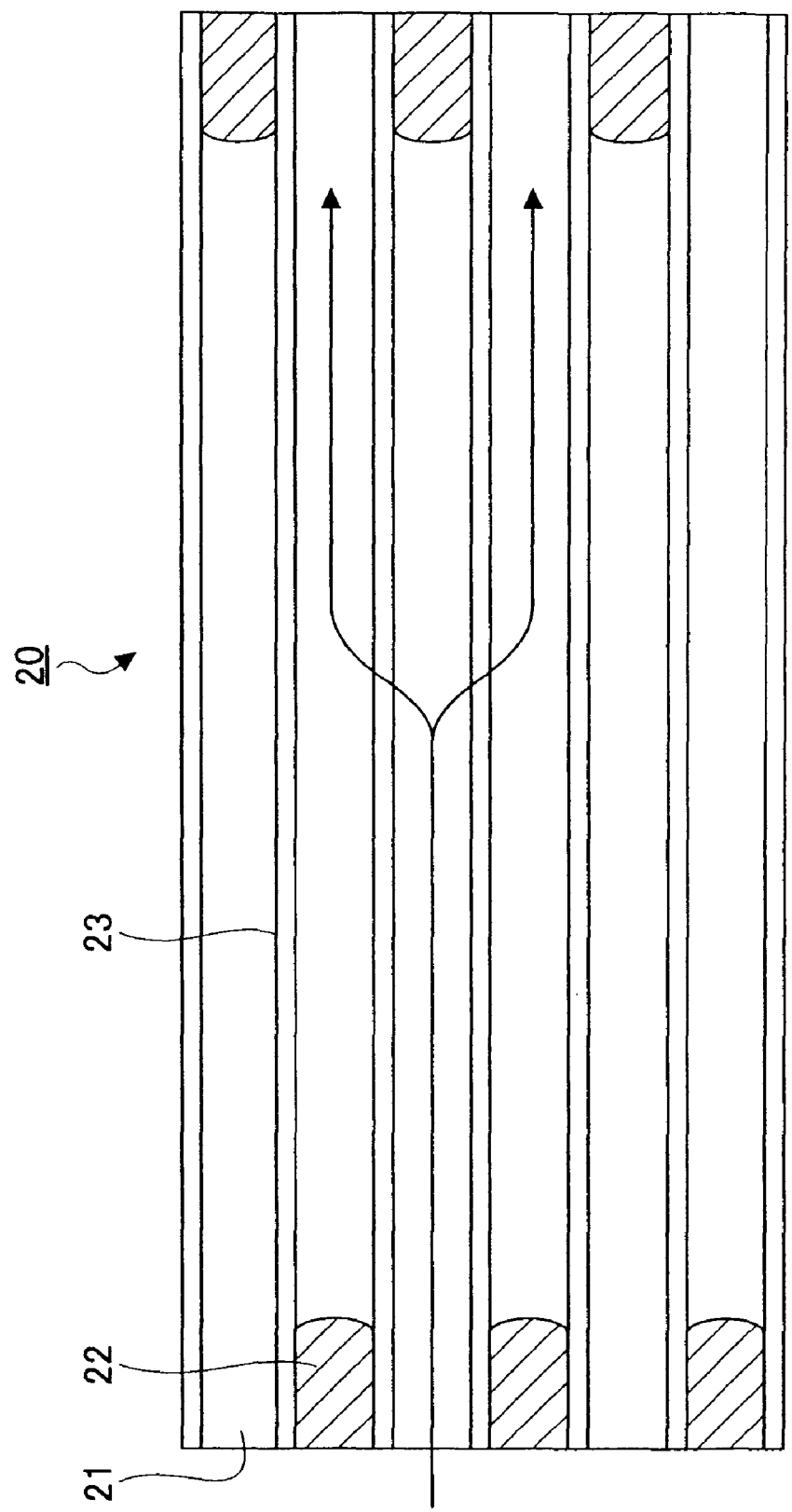
FIG. 4 is a cross-sectional view taken along the line IV-IV of the porous silicon carbide member shown in FIG. 3.

FIG. 2 schematically shows a honeycomb structural body 10 according to an embodiment of the present invention. FIG. 3 is a perspective view of a porous silicon carbide member 20 included in the honeycomb structural body 10 shown in FIG. 2. FIG. 4 is a cross-sectional view taken along line IV-IV of the porous silicon carbide member 20 of FIG. 3.

As shown in FIG. 2, the honeycomb structural body 10 is formed by assembling plural porous silicon carbide members 20 together with adhesive agent layers 11. After the porous silicon carbide members 20 are bonded with the adhesive agent layers 11, the porous silicon carbide members 20 are fabricated into a cylindrical shape, to thereby form a silicon carbide block 15. Then, a coating layer (hereinafter referred to as "seal material layer") 12 is formed around the periphery of the silicon carbide block 15.

It is to be noted that, although the silicon carbide block 10 of the honeycomb structural body 10 shown in FIG. 2 is shaped as a cylinder, the shape of the silicon carbide block 10 is not limited to a cylindrical shape but may also take the form of other shapes as long as it is a pillar-like shape. For example, the silicon carbide block 10 may have an elliptical pillar-like shape or a rectangular pillar-like shape.

As shown in FIGS. 3 and 4, the porous silicon carbide member 20 has plural cells 21 extending in the longitudinal direction of the silicon carbide member 20. The cells 21 are partitioned by a cell wall (wall part) 23 which functions as a filter. That is, as shown in FIG. 4, the cells 21 formed in the porous silicon carbide member 20 have their inlets or outlets sealed by sealing material 22, so that exhaust gas flowing into one of the cells 21 can only be discharged from another cell 21 after being filtered through a cell wall 23 partitioning the cells 21.

The honeycomb structural body 10 according to an embodiment of the present invention mainly comprises a silicon carbide type ceramic material. It is to be noted that silicon carbide type ceramic material refers to a material containing no less than 60% by weight silicon carbide.

The silicon carbide particles, which are used to manufacture the honeycomb structural body 10, include at least two groups of particles having different average particle diameters. The at least two groups of silicon carbide particles have different average particle diameters and have a first group of silicon carbide particles whose blending quantity by weight in the molding material is greatest among the at least two groups of silicon carbide particles. The first group has an average particle diameter X μm. On the other hand, the remaining silicon carbide particles having a average particle diameter have an average particle diameter preferably ranging from, for example, approximately 0.1 to 1.0 μm.

The silicon carbide particles used to form the honeycomb structural body 10 have added a pore forming material having a particle diameter Y ranging from 0.8·Z to 1.8·Z in a case where "Z" indicates the pore diameter (unit: μm) of the honeycomb structural body 10 measured by mercury porosimetry after performing a sintering process on the honeycomb structural body 10. It is preferred that the pore forming material be a material that can be eliminated with heat at a stage before reaching the temperature for sintering the silicon carbide particles (approximately 2200° C.). Here, "eliminated with heat" means that the material can be substantially removed (e.g. sublimed, vaporized, separated, dissolved) from the sintered formed body (honeycomb structural body 10) by heat. The temperature for eliminating the pore forming material is preferred to be a low temperature (e.g. preferably, 1000° C. or less, and more preferably, 500° C. or less). It is, however, preferable that the pore forming material cause no foaming during the elimination process since it is difficult to form equal sized and equal shaped pores by using such material that causes foaming.

One preferable example of the pore forming material is a synthetic resin such as an acrylic material. It is preferable to employ the synthetic resin material since the pore forming material can be eliminated with heat at a relatively low temperature and before reaching the sintering temperature of silicon carbide. Furthermore, since synthetic resin material has a relatively simple molecular structure, it is less likely to form any complex compounds when heated. Therefore, the probability of having undesired impurities (which may adversely affect the sintered silicon carbide body) remaining inside the sintered silicon carbide body is low. In addition, since synthetic resin material can be obtained at a relatively low cost, using such material as the pore forming material can prevent manufacturing costs from increasing. It is however to be noted that other materials may also be used as the pore forming material. For example, an organic polymer material such as a starch material can be used.

It is preferred that the wall part 23 and the sealing material (plug) 22 of the porous silicon carbide member 20 both be formed of the same porous silicon carbide material. This increases the bonding strength between the wall part 23 and the sealing material 22. Furthermore, by adjusting the porosity of the sealing material 22 in the same manner as the wall part 23, the coefficient of thermal expansion of the wall part 23 can be matched with the coefficient of thermal expansion of the sealing material 22. This prevents creation of gaps between the sealing material 22 and the wall part 23 and also prevents forming of cracks in the sealing material 22 or contacting areas between the sealing material 22 and the wall part 23 under situations where stress is applied during manufacture or use. It is to be noted that "wall part" not only refers to the cell walls partitioning the cells 21 but may also refer to the outer peripheral area surrounding the porous silicon nitride member 20.

Although there is no particular restriction regarding the thickness of the sealing material 22, the thickness of the sealing material 22 is preferred to range, for example, from 1 to 20 mm, and more preferably from 3 to 10 mm.

Although there is no particular restriction regarding the thickness of the wall part (cell wall) 23, the lower bound of the thickness is preferably 0.1 mm and the upper bound of the thickness is preferably 0.6 mm. In a case where the thickness of the wall part 23 is less than 0.1 mm, the strength of the honeycomb structural body 10 may be insufficient. In a case where the thickness of the wall part 23 exceeds 0.6 mm, the pressure loss of the gas flowing through the honeycomb structural body 10 increases.

In the honeycomb structural body 10 according to an embodiment of the present invention, the adhesive agent layer 11 is formed between the porous silicon carbide members 20 to function as a sealing agent for bonding the porous silicon carbide members 20 together. Furthermore, the seal material layer 12 is formed on the outer peripheral surface of the silicon carbide block 15. In a case where the honeycomb structural body 10 is mounted, for example, as a part of an exhaust passage of an internal combustion engine, the seal material layer 12 functions as a sealing material for preventing exhaust gas having passed through the cells 21 from leaking from the outer surface of the silicon carbide block 15.

In addition, the seal material layer 12 also functions as a reinforcing material of the silicon carbide block 15.

It is to be noted that the materials used for the adhesive agent layer 11 and the seal material layer 12 may be the same material or different materials. Furthermore, in a case where the same material is used for the adhesive agent layer 11 and the seal material layer 12, the compounding ratios of the material used for the adhesive agent layer 11 and the seal material layer 12 may be the same or different. Moreover, the materials of the adhesive agent layer 11 and the seal material layer 12 may be of a dense kind or a porous kind.

Although there is no particular restriction regarding the materials used as the adhesive agent layer 11 and the seal material layer 12, the materials include an inorganic binder, an organic binder, an inorganic fiber(s) and/or an inorganic particle(s).

For example, a silica sol or an alumina sol may be used as the inorganic binder. A single type of inorganic binder or a mixture of two or more types of inorganic binders may be used. Among various inorganic binders, it is preferable to use a silica sol.

As for the organic binder, polyvinyl alcohol, methyl cellulose, ethyl cellulose, and carboxymethyl cellulose, for example, may be used. A single type of organic binder or a mixture of two or more types of organic binders may be used. Among various organic binders, it is preferable to use carboxymethyl cellulose.

As for the inorganic fiber, a ceramic fiber such as silica-alumina, mullite, alumina, and silica, for example, may be used. A single type of inorganic fiber or a combination of two or more types of inorganic fibers may be used. Among various inorganic fibers, it is preferable to use a silica-alumina fiber.

As for the inorganic particles, carbide particles or nitride particles, for example, may be used. More specifically, an inorganic powder or a whisker or the like including silicon carbide particles, silicon nitride particles, or boron nitride particles may be used, for example. A single type of inorganic particle or a combination of two or more types of inorganic particles may be used. Among various inorganic particles, it is preferable to use silicon carbide particles which have satisfactory thermal conductivity.

The paste used for forming the adhesive agent layer 11 and the seal material layer 12 may have added a pore forming material including fine hollow spherical balloons containing oxide ceramic material, spherical acrylic particles or graphite particles.

Although there is no particular restriction regarding the above-described balloons, the balloons may be, for example, alumina balloons, glass micro balloons, Shirasu balloons, flyash balloons, and mullite balloons. Among various balloons, it is preferable to use alumina balloons.

The above-described honeycomb structural body 10 may be used as, for example, a filter (Diesel Particulate Filter, DPF) for collecting particulates inside exhaust gas.

Furthermore, catalyst may be carried by the honeycomb structural body 10. It is however to be noted that the cell walls 21 may be coated with a catalyst carrying layer beforehand in a case where the honeycomb structural body 10 is used to carry catalyst. This will increase the specific surface area of the honeycomb structural body 10, to thereby improve dispersiveness of the catalyst and increase the reaction area of the catalyst.

As for the catalyst carrying layer, an oxide ceramic material such as alumina, titania, zirconia, silica, or a ceria may be used.

Although there is no particular restriction regarding the catalyst provided in the catalyst carrying layer, it is preferable to use, for example, a catalyst that can purify harmful gas components in exhaust gas such as CO, HC, and NOx. Furthermore, it is also preferable to use a catalyst that can make particulates easier to burn while reducing activation energy for burning the particulates, to thereby efficiently remove the particulates. For example, the catalyst may include precious metal material such as platinum, palladium, or rhodium. The honeycomb structural body 10 may also carry a compound containing, for example, an alkali metal, an alkaline-earth metal, a rare-earth element, or a transition metal.

Accordingly, in a case where a catalyst is carried by the honeycomb structural body 10, the honeycomb structural body 10 functions as a filter that collects particulates in exhaust gas and also as a catalyst converter for purifying gas components (e.g. CO, HC, NOx) contained in exhaust gas.

It is to be noted that, although the present invention is explained by using the above-described example of the honeycomb structural body 10 having plural porous silicon carbide members 20 bonded together with the adhesive agent layer 11, the present invention may also be applied to another type of honeycomb structural body which is manufactured by being integrally molded into a cylindrical shape (as shown in FIG. 2) without using an adhesive agent layer (this type of honeycomb structural body is hereinafter referred to as "integrally molded type honeycomb structural body", and the above-described type of honeycomb structural body 10 having plural porous silicon carbide members 20 bonded together with the adhesive agent layer 11 is hereinafter referred to as "bonded type honeycomb structural body"). In a case of manufacturing the integrally molded type honeycomb structural body, an extrusion process is conducted by using a raw material paste containing silicon carbide as its main component. By conducting the extrusion process, the paste is molded into a cylindrical-shaped silicon carbide formed body having plural cells (which is to be the basis of the above-described silicon carbide block). Then, the formed body is dried. Then, the cells are sealed by filling either one of the ends of the cells with a sealing material. Accordingly, an integrally molded type honeycomb structural body can be formed having the same shape as the bonded type honeycomb structural body 10 shown in FIG. 2.

Next, an exemplary method of manufacturing a bonded type honeycomb structural body according to an embodiment of the present invention is described with reference to FIG. 5.

Figure 5:
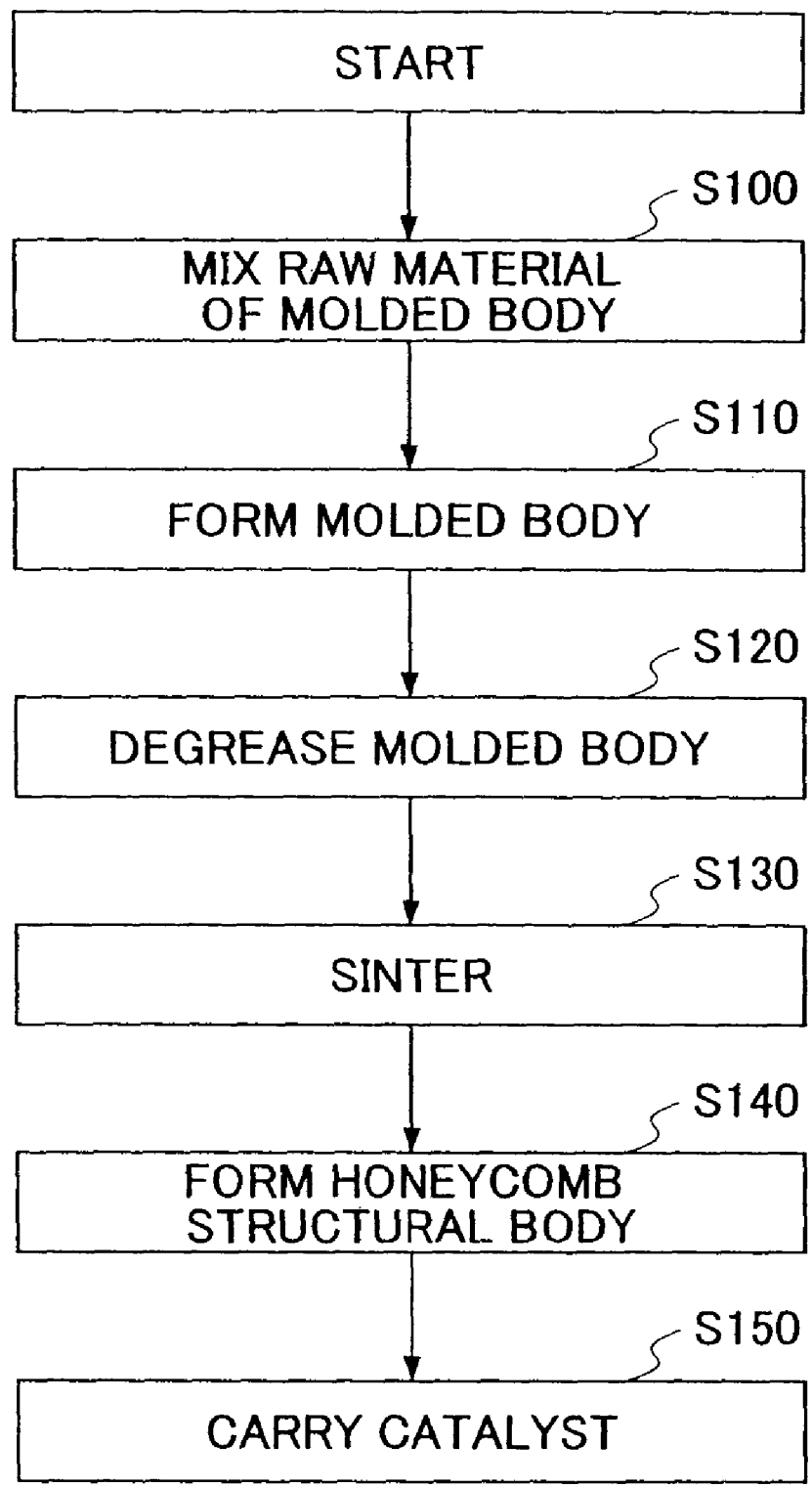
FIG. 5 is a flowchart schematically showing the steps of manufacturing a honeycomb structural body according to an embodiment of the present invention.

FIG. 5 is a flowchart showing the steps of manufacturing the honeycomb structural body according to an embodiment of the present invention. First, in Step S100, a raw material paste (which is to be used as the raw material for forming a molded body) is prepared by mixing together α type coarse-grained silicon carbide particles having an average particle diameter ranging from approximately 15 μm to 40 μm, α type fine-grained silicon carbide particles having an average particle diameter ranging from approximately 0.5 μm to 1.0 μm, and a pore forming material. In this example, the average diameter X of the silicon carbide particles is selected to satisfy a relationship of $0.5 \cdot X \leq Z \leq 0.9 \cdot X$ in a case where "Z" is the average pore diameter of a completed honeycomb structural body. Furthermore, the raw material(s) and the conditions for manufacturing the honeycomb structural body are selected so that the average pore diameter Z of a completed honeycomb structural body ranges from 10 μm to 20 μm. Furthermore, the average particle diameter Y of the pore forming material is selected to satisfy a relationship of $0.8 \cdot Z \leq Y \leq 1.8 \cdot Z$. The pore forming material used in this example may be a pore forming material including fine hollow spherical balloons containing oxide ceramic material, spherical acrylic particles or graphite particles.

Furthermore, a binder and a dispersing solvent or the like may be added to the raw material paste. Although there is no particular restriction regarding the binder, the binder may be, for example, methyl cellulose, carboxy methyl cellulose, hydroxyl ethyl cellulose, polyethylene glycol, phenolic resin, and epoxy resin. Normally, the compound amount of the binder is preferably approximately 1-10 parts by weight with respect to 100 parts by weight of ceramic powder. Although there is no particular restriction regarding the dispersing solvent, the dispersing solvent may be, for example, an organic solvent (e.g. benzene), alcohol (e.g. methanol), or water. An adequate amount of the dispersing solvent is added to the raw material paste so that the raw material paste may have a viscosity within a predetermined range. The above-described silicon carbide powder, the pore forming material, the binder, and the dispersing solvent are mixed together by using, for example, an attritor mill and thoroughly kneaded by using, for example, a kneader, to thereby obtain the raw material paste. The raw material paste is then used in the below-described extrusion process.

Furthermore, a mold auxiliary agent may also be added to the raw material paste. Although there is no particular restriction regarding the mold auxiliary agent, the mold auxiliary agent may be, for example, ethylene glycol, dextrin, aliphatic acid, fatty soap, or polyvinyl alcohol.

Then, in Step S110, the raw material paste is used in an extrusion process to obtain a molded body having a quadratic pillar-like shape. The extruded molded body is dried by using, for example, a microwave dryer, a hot air dryer, a dielectric dryer, a decompression dryer, a vacuum dryer, or a freeze dryer. Thereby, the extruded molded body becomes a dried molded body. Then, a paste of sealing material of a predetermined amount is filled into predetermined end parts on both sides of the cells of the dried molded body so that either one of the end parts of each cell is sealed. Although there is no particular restriction regarding the sealing material paste, it is preferable that the sealing material exhibits a porosity ranging from 45% to 60% after going through various subsequent processes (e.g. degreasing process, sintering process). For example, the sealing material paste may use the same material as the above-described raw material paste.

Then, in Step S120, the dried molded body having predetermined parts supplied with the sealing material paste is subjected to a degreasing process under predetermined conditions (e.g. at a temperature ranging from 200° C. to 500° C.). Thereby, the materials (e.g. pore forming material, binder) contained in the dried molded body are eliminated by heat. Accordingly, pores having substantially the same shape as the pore forming material are formed at areas where the pore forming material used to exist before being eliminated.

Then, in Step S130, a sintering process is performed on the dried molded body (degreased molded body). By conducting the sintering process, the porous silicon carbide member 20 can be fabricated. It is preferable to select the sintering conditions (e.g. sinter at a temperature between 1400° C. to 2200° C. for three to five hours), so that the average pore diameter of the porous silicon member 20 measured by mercury porosimetry ranges from 10 µm to 20 µm. It is to be noted that, the method of the present invention is able to efficiently fabricate a porous silicon carbide member 20 having a sharp pore diameter distribution in a shorter time at a lower temperature compared to the conventional method (for example, the conventional method sinters under the conditions where the sintering temperature is 2200° C. or more and the sintering time is seven hours).

Then, a paste containing adhesive material (which is to be the adhesive material layer 11) is evenly applied (pasted) to the side(s) of the porous silicon carbide member 20. Then, another porous silicon carbide member 20 is mounted onto the side of the porous silicon carbide member 20 on which the adhesive material paste is applied. By repeating this pasting and mounting process, a bonded body having plural porous silicon carbide members 20 bonded together can be fabricated with a desired size.

The material used for the adhesive material paste is the same as that used for the above-described paste of the seal material.

Then, the bonded body having plural porous silicon carbide members 20 bonded together is heated. By heating the bonded body, the adhesive material paste is dried and bonded to form the adhesive material layer 11. Thereby, the porous silicon carbide members 20 can be bonded to each other.

Then, the bonded body is cut by using, for example, a diamond cutter. Thereby, a silicon carbide block 15 having a cylindrical shape with a predetermined outer diameter can be obtained.

Furthermore, by applying, drying, and bonding the seal material paste on the outer peripheral side of the silicon carbide block 15, the seal material layer 12 is formed. By completing the above-described processes, a cylindrical bonded type honeycomb structural body 10 having plural porous silicon carbide members 20 bonded together via the adhesive material layer 11 can be fabricated.

It is to be noted that the integrally molded type honeycomb structural body is formed substantially with the same processes for fabricating the bonded type honeycomb structural body 10. In fabricating the integrally molded type honeycomb structural body, a silicon carbide molded body (which is extruded into a shape substantially the same as the final completed shape) is dried and has predetermined end parts of its cells sealed with a sealing material. Then, the dried molded body is subjected to a degreasing process and a sintering process. Thereby, the integrally molded type honeycomb structural body is completed.

It is to be noted that the honeycomb structural body (including both the bonded type and the integrally molded type honeycomb structural body) according to an embodiment of the present invention may carry catalyst such as precious metal in Step S150.

For example, in a case of carrying catalyst with the honeycomb structural body according to an embodiment of the present invention, a catalyst carrying layer made of, for example, alumina is formed on the honeycomb structural body. For example, the catalyst carrying layer may be formed by dipping the honeycomb structural body in a solution containing alumina powder and heating the dipped honeycomb structural body after pulling out the honeycomb structural body from the solution. After the process of forming a catalyst carrying layer of alumina, the honeycomb structural body may further be dipped in a solution containing $Ce(NO_3)_3$, so that the catalyst carrying layer can have a rare earth element(s) contained therein.

As for a method of having catalyst carried in such a catalyst carrying layer, there is, for example, a method of dipping a sintered silicon carbide body having a catalyst carrying layer into a diammine dinitro platinum nitric acid solution ($[Pt(NH_3)_2(NO_2)_2]HNO_3$) and heating the dipped sintered silicon carbide body.

As another method, there is a method of dipping a honeycomb structural body into a platinum-carrying alumina slurry (for example, platinum concentration 5% by weight) for two minutes and heating the dipped honeycomb structural body at a temperature of 500° C. after pulling out the honeycomb structural body from the alumina slurry. As a result, the catalyst carrying layer can carry platinum catalyst.

Furthermore, the catalyst carrying layer of the honeycomb structural body may also carry an oxide catalyst such as a $CeO_2$—$ZrO_2$ mixture, a $CeO_2$—$CuO_2$ mixture, and a $CeO_2$—$FeO_2$ mixture or $LaCoO_3$.

In a case where a $CeO_2$—$ZrO_2$ mixture is to be carried as the oxide catalyst by the honeycomb structural body, the oxide catalyst is formed by dipping a honeycomb structural body into a solution containing 10 g of CZ ($nCeO_2 \cdot mZrO_2$), 40 ml of water, and an adequate amount of a pH regulator for five minutes and sintering the dipped honeycomb structural body at a temperature of 500° C. after pulling out the honeycomb structural body from the solution.

In a case where $LaCoO_3$ is to be carried as the oxide catalyst by the honeycomb structural body, the oxide catalyst is formed by preparing a solution formed by adding and mixing (agitating) 80.01 mol of $La(NO_3)_3 \cdot 6H_2O$, 0.01 mol of $Co(CH_3COO)_2 \cdot 4H_2O$, and 0.024 mol of $C_6H_8O_7 \cdot H_2O$ (citric acid) in proportion to 20 ml of ethyl alcohol. Then, the honeycomb structural body is dipped into the solution. Then, after removing unnecessary sol from the dipped honeycomb structural body, the honeycomb structural body is dried at a temperature of 100° C. Then, the dried honeycomb structural body is sintered at a temperature of 600° C. for one hour. As a result, the honeycomb structural body can carry $LaCoO_3$ as the catalyst.

It is to be noted that, in a case of the integrally molded type honeycomb structural body, the above-described methods for providing (forming) the catalyst in the honeycomb structural body are conducted after completing the forming (fabricating) of the honeycomb structural body. Meanwhile, in a case of the bonded type honeycomb structural body, the timing (stage) for conducting the above-described methods for providing (forming) the catalyst in the honeycomb structural body is not to be limited as long as the forming (fabricating) of the porous silicon carbide member 20 is completed.

Although the purpose (usage) of the above-described honeycomb structural body is not limited in particular, the honeycomb structural body may be used in an exhaust gas purifying apparatus of a vehicle.

Figure 6:
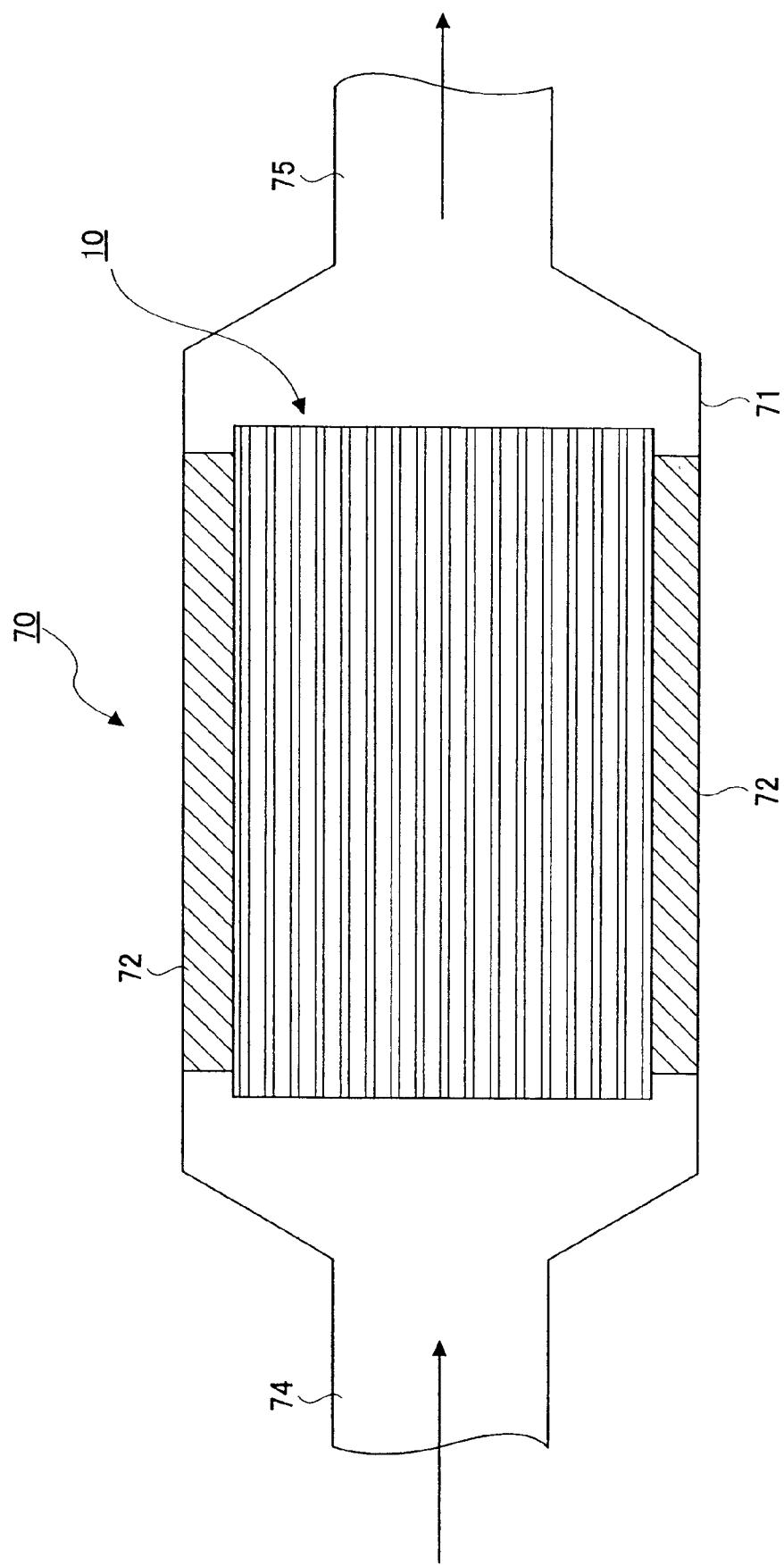
FIG. 6 is a cross-sectional view schematically showing an automobile exhaust gas purifying apparatus provided with a honeycomb structural body according to an embodiment of the present invention.

FIG. 6 schematically shows an example of an exhaust gas purifying apparatus 70 on which the honeycomb structural body 10 according to an embodiment of the present invention is mounted.

As shown in FIG. 6, the exhaust gas purifying apparatus 70 mainly includes, for example, the honeycomb structural body 10, a casing 71 surrounding the outer periphery of the honeycomb structural body 10, and a retaining seal material 72 provided between the honeycomb structural body 10 and the casing 71. An inflow pipe 74, which is in fluid communication with an internal combustion engine, is connected to one end part of the casing 71 for allowing exhaust gas to be guided into the casing 71. An outflow pipe 75, which is in fluid communication with the outside, is connected to the other end part of the casing 71 for enabling exhaust gas to be discharged out from the casing 71. It is to be noted that the arrows shown in FIG. 6 indicate the flow of exhaust gas.

In the exhaust gas purifying apparatus 70, exhaust gas discharged from an internal combustion engine is guided into the casing 71 by passing through the inflow pipe 74 and advances into the honeycomb structural body 10 through the end parts of those cells that are open toward the inflow pipe 74. The exhaust gas flowing into the honeycomb structural body 10 passes through the cell walls. Accordingly, the exhaust gas is purified by having its particulates collected at the cell walls. Then, the purified exhaust gas is discharged from the honeycomb structural body 10 through end parts of other cells that are open toward the outflow pipe 75. Finally, the purified exhaust gas is discharged from the outflow pipe 75. Furthermore, in a case where catalyst is provided in the honeycomb structural body 10, harmful components contained in the exhaust gas (e.g. CO, HC, NOx) are purified when the exhaust gas passes through the cell walls.

EXAMPLES

The present invention is described in further detail with reference to the below-described examples of the present invention.

Fabrication of Honeycomb Structural Body of Example 1

First, a mixed compound is obtained by dry mixing coarse-grained silicon carbide particles having an average particle diameter of 20 μm (6000 parts by weight), fine-grained silicon carbide particles having an average particle diameter of 0.5 μm (2570 parts by weight), hollow acrylic particles (serving as the pore forming material) having an average particle diameter of 17.5 μm (300 parts by weight), and an organic binder of methyl cellulose (550 parts by weight).

Then, the mixed compound has added a plasticizer ("Unilube" manufactured by Nippon Oil & Fats Co. Ltd.) of 330 parts by weight, glycerin (used as a lubricant) of 150 parts by weight, and water of an adequate amount. After the mixed compound is further kneaded, the kneaded mixed compound is subjected to an extrusion process. As a result, a rectangular pillar-like molded body as shown in FIG. 3 is obtained.

Then, the molded body is dried by using a microwave dryer and a hot air dryer so that the molded body becomes a dried silicon carbide molded body. Then, a seal material paste having the same composition as the molded body is supplied into predetermined cells of the molded body.

Then, the molded body having its predetermined cells filled with seal material paste is dried again with a hot air dryer. Then, the molded body is degreased at a temperature of 400° C. and has its pore forming material eliminated. Then, the molded body is sintered at a temperature of 2160° C. in argon at an atmospheric pressure for three hours. Thereby, a porous silicon carbide member 20 having a sintered silicon carbide body of 34.3 mm×34.3 mm×150 mm is fabricated. The number of cells of the porous silicon carbide member 20 is 46.5 cells/cm$^2$ (300 cpsi). In example 1, the thickness of all the cells is substantially 0.25 mm.

Then, an adhesive material paste is used to bond plural porous silicon carbide members 20 together. The adhesive material paste contains, by weight, 30% alumina fiber having a fiber length of 0.2 mm, 21% silicon carbide particles having an average particle diameter of 0.6 μm, 15% silica sol, 5.6% carboxy methyl cellulose, and 28.4% water. Then, the bonded assembly of the porous silicon carbide members 20 is cut into a cylindrical shape by using a diamond cutter. Thereby, a cylindrical-shaped silicon carbide block 15 is fabricated.

Then, the same paste as the adhesive material paste is applied for coating the outer peripheral part of the silicon carbide block 15, to thereby form a seal material paste layer having a thickness of 0.2 mm. Then, the seal material paste layer is hardened by being dried at a temperature of 120° C. The fabrication of a cylindrical honeycomb structural body having a diameter of 143.8 mm and a length of 150 mm is completed after the hardening process is finished. The fabricated honeycomb structural body is hereinafter referred to as Example 1.

Fabrication of Honeycomb Structural Body of Examples 2-16

The below-described honeycomb structural bodies of Examples 2-16 are fabricated by performing the same processes for fabricating the honeycomb structural body of Example 1 except that each of the Examples 2-16 employs a different mixed compound that is prepared by altering the average particle diameter and the added amount of the coarse-grained silicon carbide powders, the added amount of the fine-grained silicon carbide powders, the average particle diameter and the added amount of hollow acrylic particles serving as a pore forming material, and the added amount of methyl cellulose. It is however to be noted that the sintering temperature and the sintering time for fabricating the honeycomb structural bodies of Examples 12 and 13 (2200° C., five hours) are different from those applied for fabricating the honeycomb structural body of Example 1. The specifications of the raw materials and the sintering conditions for fabricating the honeycomb structural bodies of Examples 1-16 are indicated in Table 1 shown below.

TABLE 1

|  | COARSE-GRAINED SILICON CARBIDE PARTICLE | | FINE-GRAINED SILICON CARBIDE PARTICLE | | HOLLOW ACRYLIC PARTICLE | | MC |
|---|---|---|---|---|---|---|---|
|  | PARTICLE DIAMETER (μm) | QUANTITY (PART BY WEIGHT) | PARTICLE DIAMETER (μm) | QUANTITY (PART BY WEIGHT) | PARTICLE DIAMETER (μm) | QUANTITY (PART BY WEIGHT) | QUANTITY (PART BY WEIGHT) |
| EXAMPLE 1 | 20.0 | 6000 | 0.5 | 2570 | 17.5 | 300 | 550 |
| EXAMPLE 2 | 20.0 | 6000 | 0.5 | 2570 | 10.0 | 300 | 550 |
| EXAMPLE 3 | 20.0 | 6000 | 0.5 | 2570 | 23.0 | 300 | 550 |
| EXAMPLE 4 | 20.0 | 6290 | 0.5 | 2690 | 15.0 | 250 | 550 |
| EXAMPLE 5 | 20.0 | 6290 | 0.5 | 2690 | 9.0 | 250 | 550 |
| EXAMPLE 6 | 20.0 | 6290 | 0.5 | 2690 | 20.0 | 250 | 550 |
| EXAMPLE 7 | 20.0 | 5710 | 0.5 | 2450 | 22.5 | 350 | 550 |
| EXAMPLE 8 | 20.0 | 5710 | 0.5 | 2450 | 14.0 | 350 | 550 |
| EXAMPLE 9 | 20.0 | 5710 | 0.5 | 2450 | 32.0 | 350 | 550 |
| EXAMPLE 10 | 15.0 | 6290 | 0.5 | 2690 | 8.0 | 250 | 550 |
| EXAMPLE 11 | 15.0 | 6290 | 0.5 | 2690 | 18.0 | 250 | 550 |
| EXAMPLE 12 | 15.0 | 6290 | 0.5 | 2690 | 11.0 | 250 | 550 |
| EXAMPLE 13 | 15.0 | 6290 | 0.5 | 2690 | 24.0 | 250 | 550 |
| EXAMPLE 14 | 35.0 | 4540 | 0.5 | 1950 | 15.0 | 700 | 630 |
| EXAMPLE 15 | 35.0 | 4540 | 0.5 | 1950 | 34.5 | 700 | 630 |
| EXAMPLE 16 | 40.0 | 4540 | 0.5 | 1950 | 36.0 | 700 | 630 |
| COMPARATIVE EXAMPLE 1 | 20.0 | 6000 | 0.5 | 2570 | 9.0 | 300 | 550 |
| COMPARATIVE EXAMPLE 2 | 20.0 | 6000 | 0.5 | 2570 | 23.0 | 300 | 550 |
| COMPARATIVE EXAMPLE 3 | 20.0 | 5710 | 0.5 | 2450 | 20.0 | 350 | 550 |
| COMPARATIVE EXAMPLE 4 | 15.0 | 6290 | 0.5 | 2690 | 7.0 | 250 | 550 |
| COMPARATIVE EXAMPLE 5 | 15.0 | 6290 | 0.5 | 2690 | 20.0 | 250 | 550 |
| COMPARATIVE EXAMPLE 6 | 35.0 | 4540 | 0.5 | 1950 | 13.5 | 700 | 630 |
| COMPARATIVE EXAMPLE 7 | 35.0 | 4540 | 0.5 | 1950 | 37.5 | 700 | 630 |
| COMPARATIVE EXAMPLE 8 | 40.0 | 4540 | 0.5 | 1950 | 40.0 | 700 | 630 |
| COMPARATIVE EXAMPLE 9 | 20.0 | 5130 | 0.5 | 2200 | 40.0 | 700 | 490 |

|  | PLASTICIZER QUANTITY (PART BY WEIGHT) | LUBRICANT QUANTITY (PART BY WEIGHT) | WATER QUANTITY (PART BY WEIGHT) | SINTERING | |
|---|---|---|---|---|---|
|  |  |  |  | TEMPERATURE (° C.) | TIME (hr) |
| EXAMPLE 1 | 330 | 150 | ADEQUATE QUANTITY | 2160 | 3 |
| EXAMPLE 2 | 330 | 150 | ADEQUATE QUANTITY | 2160 | 3 |
| EXAMPLE 3 | 330 | 150 | ADEQUATE QUANTITY | 2160 | 3 |
| EXAMPLE 4 | 330 | 150 | ADEQUATE QUANTITY | 2100 | 3 |
| EXAMPLE 5 | 330 | 150 | ADEQUATE QUANTITY | 2160 | 3 |
| EXAMPLE 6 | 330 | 150 | ADEQUATE QUANTITY | 2100 | 3 |
| EXAMPLE 7 | 330 | 150 | ADEQUATE QUANTITY | 2160 | 3 |

TABLE 1-continued

|  |  |  |  |  |  |
|---|---|---|---|---|---|
| EXAMPLE 8 | 330 | 150 | ADEQUATE QUANTITY | 2160 | 3 |
| EXAMPLE 9 | 330 | 150 | ADEQUATE QUANTITY | 2160 | 3 |
| EXAMPLE 10 | 330 | 150 | ADEQUATE QUANTITY | 2160 | 3 |
| EXAMPLE 11 | 330 | 150 | ADEQUATE QUANTITY | 2160 | 3 |
| EXAMPLE 12 | 330 | 150 | ADEQUATE QUANTITY | 2200 | 5 |
| EXAMPLE 13 | 330 | 150 | ADEQUATE QUANTITY | 2200 | 5 |
| EXAMPLE 14 | 330 | 150 | ADEQUATE QUANTITY | 2160 | 3 |
| EXAMPLE 15 | 330 | 150 | ADEQUATE QUANTITY | 2160 | 3 |
| EXAMPLE 16 | 330 | 150 | ADEQUATE QUANTITY | 2160 | 3 |
| COMPARATIVE EXAMPLE 1 | 330 | 150 | ADEQUATE QUANTITY | 2160 | 3 |
| COMPARATIVE EXAMPLE 2 | 330 | 150 | ADEQUATE QUANTITY | 2160 | 3 |
| COMPARATIVE EXAMPLE 3 | 330 | 150 | ADEQUATE QUANTITY | 2250 | 7 |
| COMPARATIVE EXAMPLE 4 | 330 | 150 | ADEQUATE QUANTITY | 2160 | 3 |
| COMPARATIVE EXAMPLE 5 | 330 | 150 | ADEQUATE QUANTITY | 2160 | 3 |
| COMPARATIVE EXAMPLE 6 | 330 | 150 | ADEQUATE QUANTITY | 2160 | 3 |
| COMPARATIVE EXAMPLE 7 | 330 | 150 | ADEQUATE QUANTITY | 2160 | 3 |
| COMPARATIVE EXAMPLE 8 | 330 | 150 | ADEQUATE QUANTITY | 2160 | 3 |
| COMPARATIVE EXAMPLE 9 | 330 | 150 | ADEQUATE QUANTITY | 2160 | 3 |

Fabrication of Honeycomb Structural Body of Comparative Examples 1-9

Likewise, the below-described honeycomb structural bodies of Comparative Examples 1-9 are fabricated by performing the same processes for fabricating the honeycomb structural body of Example 1 except that a molded body is fabricated by preparing a mixed compound by mixing the components shown in FIG. 1 and extruding the mixed compound. It is however to be noted that the sintering temperature and the sintering time for fabricating the honeycomb structural body of Comparative Example 3 (2250° C., seven hours) are different from those applied for fabricating the honeycomb structural body of Example 1.

[Evaluation Test]
(1) Measurement of Average Particle Diameter and Porosity

The honeycomb structural bodies of Examples 1-16 and Comparative Examples 1-9 are subjected to an evaluation test in which the distribution of fine pores ranging from 0.1-360 μm is measured by conducting mercury porosimetry with a porosimeter (manufactured by Shimadzu Corporation, Auto-Pore III9420). By conducting the measurements, the average pore diameter and the porosity of each test samples are obtained. The obtained results are shown in Table 2. All of the measured honeycomb structural bodies exhibited an aimed for porosity of approximately 45 to 60%. Meanwhile, although the pore diameter is aimed for to range from 10 to 20 μm, the honeycomb structural body of Comparative Example 4 exhibited a pore diameter less than the aimed for pore diameter (pore diameter of 9.8 μm) and the honeycomb structural bodies of Comparative Examples 7 and 8 each exhibited a pore diameter exceeding the aimed for pore diameter (pore diameter of 20.3 and 21.5, respectively).

TABLE 2

|  | COARSE-GRAINED SILICON CARBIDE PARTICLE X (μm) | X * 0.5~X * 0.9 (μm) | PORE DIAMETER Z (μm) | Z * 0.8~Z * 1.8 (μm) | PORE FORMING MATERIAL PARTICLE DIAMETER Y (μm) | POROSITY (%) | PORE PEAK WIDTH (μm) | COLLECTION EFFICIENCY (%) |
|---|---|---|---|---|---|---|---|---|
| EXAMPLE 1 | 20 | 10.0~18.0 | 12.5 | 10.0~22.5 | 17.5 | 47.5 | 2.5 | 96 |
| EXAMPLE 2 | 20 | 10.0~18.0 | 12.3 | 9.84~22.1 | 10 | 47.5 | 2.9 | 95 |
| EXAMPLE 3 | 20 | 10.0~18.0 | 12.8 | 10.2~23.0 | 23 | 47.5 | 4.2 | 93 |
| EXAMPLE 4 | 20 | 10.0~18.0 | 10.8 | 8.6~19.4 | 15 | 45 | 2.6 | 96 |
| EXAMPLE 5 | 20 | 10.0~18.0 | 11 | 8.8~19.8 | 9 | 45 | 2.8 | 96 |
| EXAMPLE 6 | 20 | 10.0~18.0 | 11.2 | 8.96~20.2 | 20 | 45 | 4.5 | 94 |
| EXAMPLE 7 | 20 | 10.0~18.0 | 17.5 | 14.0~31.5 | 22.5 | 50 | 4.3 | 93 |

TABLE 2-continued

| | COARSE-GRAINED SILICON CARBIDE PARTICLE X (μm) | X * 0.5~X * 0.9 (μm) | PORE DIAMETER Z (μm) | Z * 0.8~Z * 1.8 (μm) | PORE FORMING MATERIAL PARTICLE DIAMETER Y (μm) | POROSITY (%) | PORE PEAK WIDTH (μm) | COLLECTION EFFICIENCY (%) |
|---|---|---|---|---|---|---|---|---|
| EXAMPLE 8 | 20 | 10.0~18.0 | 17.3 | 13.8~31.1 | 14 | 50 | 4.9 | 93 |
| EXAMPLE 9 | 20 | 10.0~18.0 | 17.9 | 14.3~32.2 | 32 | 50 | 6.8 | 91 |
| EXAMPLE 10 | 15 | 7.5~13.5 | 10 | 8.0~18.0 | 8 | 45 | 2.9 | 96 |
| EXAMPLE 11 | 15 | 7.5~13.5 | 10.5 | 8.4~18.9 | 18 | 45 | 4.4 | 94 |
| EXAMPLE 12 | 15 | 7.5~13.5 | 13.2 | 10.6~23.8 | 11 | 45 | 3.6 | 95 |
| EXAMPLE 13 | 15 | 7.5~13.5 | 13.5 | 10.8~24.3 | 24 | 45 | 6.1 | 90 |
| EXAMPLE 14 | 35 | 17.5~31.5 | 18.3 | 14.6~32.9 | 15 | 60 | 5.7 | 91 |
| EXAMPLE 15 | 35 | 17.5~31.5 | 19.7 | 15.8~35.5 | 34.5 | 60 | 7.6 | 90 |
| EXAMPLE 16 | 40 | 20.0~36.0 | 20 | 16.0~36.0 | 36 | 60 | 6.4 | 92 |
| COMPARATIVE EXAMPLE 1 | 20 | 10.0~18.0 | 11.9 | 9.5~21.4 | 9 | 47.5 | 10.0 | 86 |
| COMPARATIVE EXAMPLE 2 | 20 | 10.0~18.0 | 12.5 | 10.0~22.5 | 23 | 47.5 | 10.7 | 84 |
| COMPARATIVE EXAMPLE 3 | 20 | 10.0~18.0 | 20 | 16.0~36.0 | 20 | 50 | 7.5 | 90 |
| COMPARATIVE EXAMPLE 4 | 15 | 7.5~13.5 | 9.8 | 7.8~17.6 | 7 | 45 | 9.6 | 87 |
| COMPARATIVE EXAMPLE 5 | 15 | 7.5~13.5 | 10.9 | 8.7~19.6 | 20 | 45 | 10.4 | 84 |
| COMPARATIVE EXAMPLE 6 | 35 | 17.5~31.5 | 17.8 | 14.2~32.0 | 13.5 | 60 | 11.5 | 84 |
| COMPARATIVE EXAMPLE 7 | 35 | 17.5~31.5 | 20.3 | 16.2~36.5 | 37.5 | 60 | 12.8 | 83 |
| COMPARATIVE EXAMPLE 8 | 40 | 20.0~36.0 | 21.5 | 17.2~38.7 | 40 | 60 | 13.6 | 78 |
| COMPARATIVE EXAMPLE 9 | 20 | 10.0~18.0 | 17 | 13.6~30.6 | 40 | 55 | 15.4 | 82 |

Figure 7:
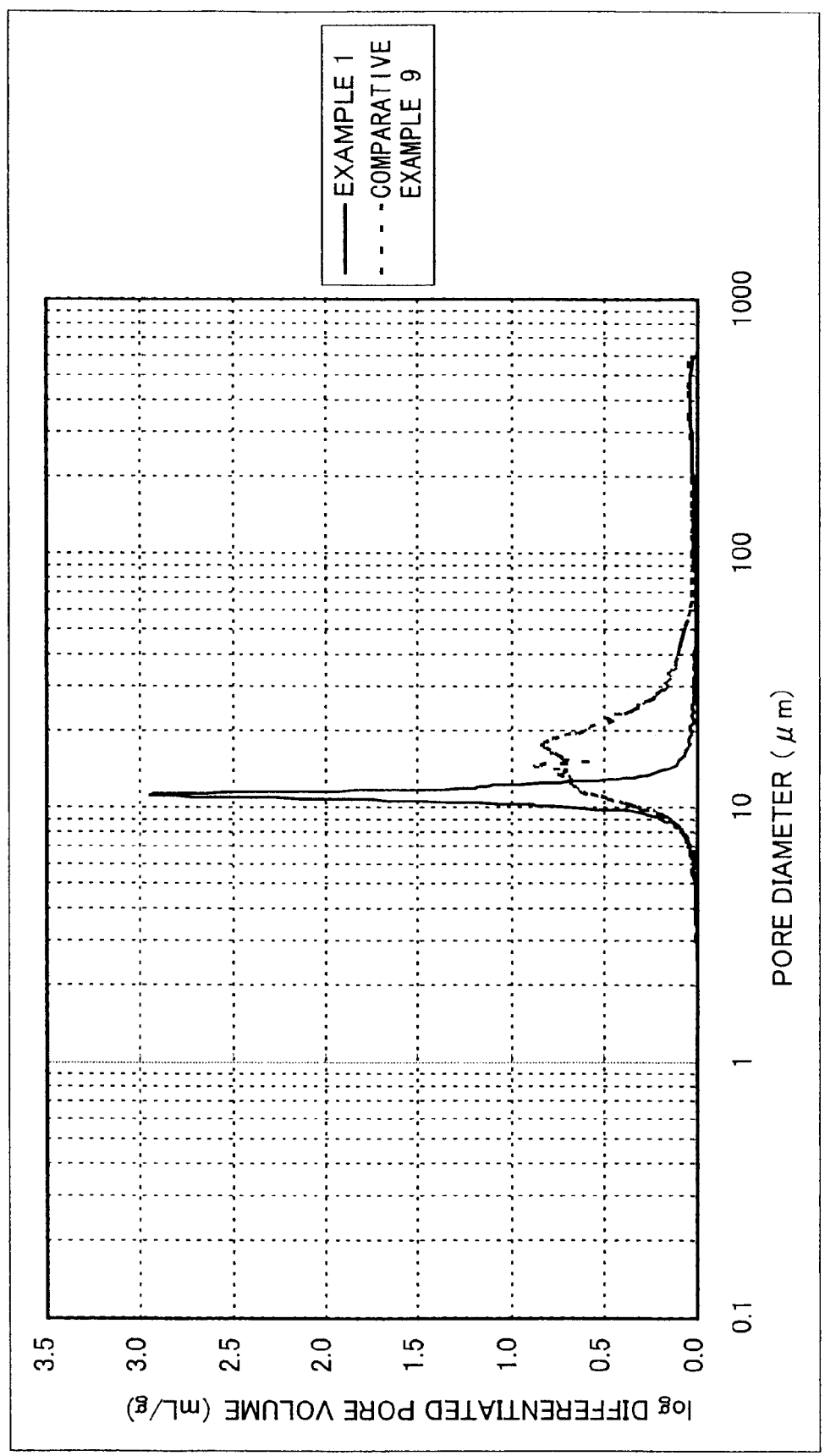
FIG. 7 is a graph schematically showing pore diameter distributions of honeycomb structural bodies of example 1 and a comparative example 9.

FIG. 7 shows the pore diameter distribution obtained from the honeycomb structural bodies of Example 1 and Comparative Example 9. The frequency of the vertical axis is indicated by log differentiated pore volume (mL/g). In a case where D(n) indicates the fine pore diameter and V(n) indicates integrated pore volume, the log differentiated pore volume Vld (n) can be represented as:

$$Vld(1)=0, Vld(n)=\{V(n)-V(n-1)\}/\{ \log [D(n-1)] - \log [D(n)]\}, (n \geq 2).$$

According to FIG. 7, the honeycomb structural body of Example 1 exhibits a sharp high peak at the area where the average pore diameter is approximately 12.5 μm. Meanwhile, the honeycomb structural body of Comparative Example 9 exhibits a wide low distribution at the area where the average pore diameter is approximately 12.5 μm.

Figure 8:
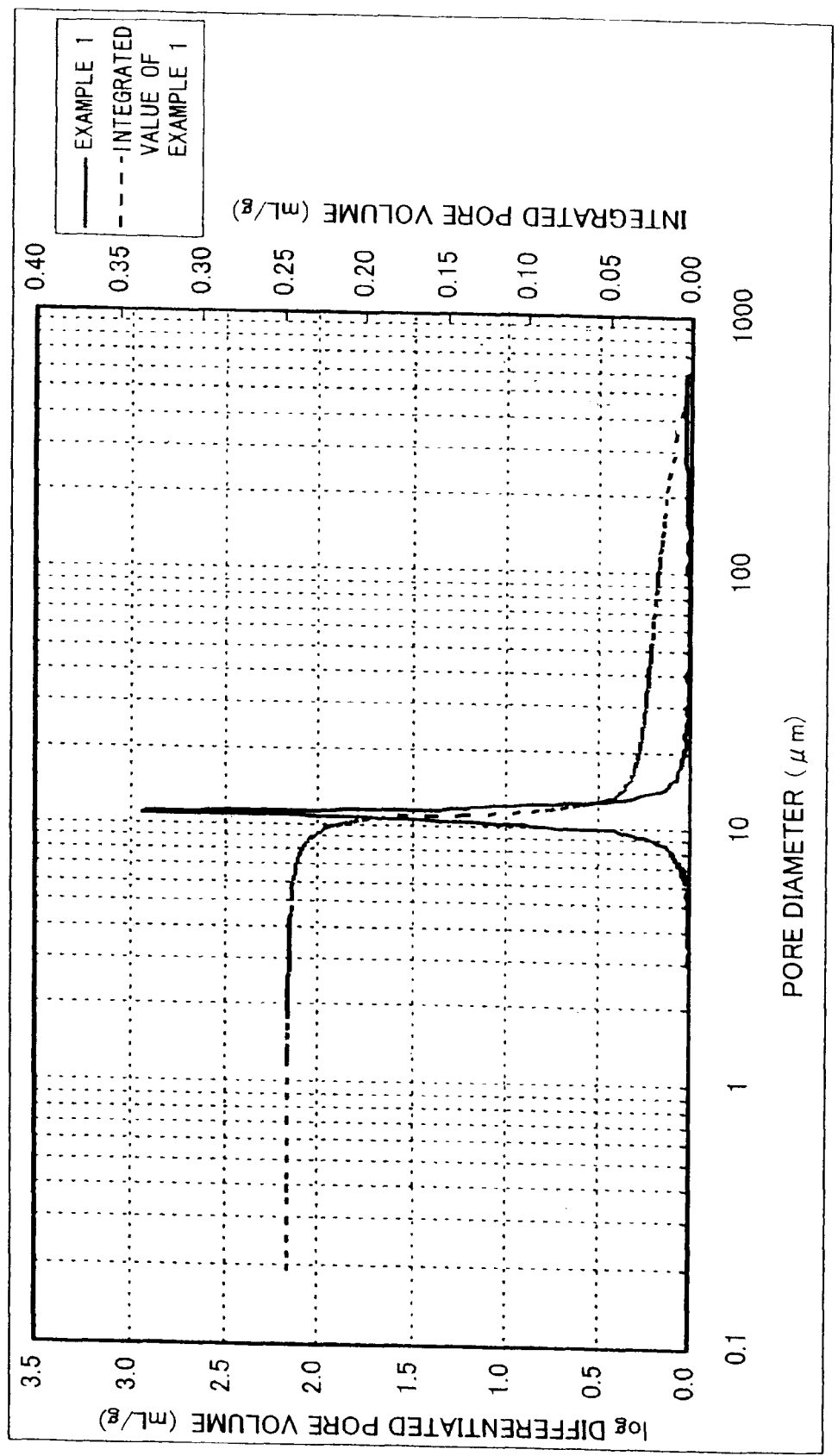
FIG. 8 is a graph showing a pore diameter distribution and an integrated pore distribution of a honeycomb structural body of example 1.

FIG. 8 is a graph showing the distribution of the integrated pore volume and the distribution of the differentiated pore volume distribution exhibited by the honeycomb structural body of Example 1. The foregoing Table 2 shows the results of obtaining a pore peak width (unit: μm) which is the width of the remaining integrated pore diameter distribution (60%) obtained by subtracting the area between 80% of the integrated pore diameter and the maximum value and the area between the minimum value and 20% of the integrated pore diameter from the entire integrated pore diameter distribution. The pore peak width serves as an index for showing the sharpness of the peak of the pore diameter distribution. The peak of the pore diameter distribution becomes sharper as the value of the pore peak width becomes smaller. The results of Table 2 show that the greatest pore peak width exhibited by the honeycomb structural bodies of Examples 1-16 is 6.8 μm (Example 9) while the greatest pore peak width exhibited by the honeycomb structural bodies of the Comparative Examples 1-9 is approximately 10 μm or more (except for Comparative Example 3). In other words, the honeycomb structural bodies of Examples 1-16 each exhibit a sharper pore diameter peak than that of the Comparative Examples 1-9 (except for Comparative Example 3).

Furthermore, the honeycomb structural body of Comparative Example 3, which exhibits a relatively sharp pore diameter distribution peak, is fabricated by performing the sintering process for a long amount of time for attaining a sufficient sintering reaction. In other words, the sintering process is to be conducted at a temperature of 2250° C. for seven hours in order to obtain the honeycomb structural body of Comparative Example 3. Meanwhile, a pore diameter distribution exhibiting a sharp peak can be obtained by conducting the sintering process at a lower temperature for a shorter amount of time with the honeycomb structural bodies of Examples 1-16.

(2) Measurement of Collection Efficiency

The honeycomb structural bodies of Examples 1-16 and Comparative Examples 1-9 are subjected to another evaluation test in which the collection efficiency (efficiency for collecting particulates and the like) of the honeycomb structural bodies is measured by placing the honeycomb structural bodies in an exhaust passage of an internal combustion engine. The measurement of the collection efficiency is conducted as described below. A diesel engine having a displacement of 2 liters is driven under the conditions where the engine rotational speed is 2000 rpm and the engine torque is 47 N·m. The exhaust gas, which is discharged from the engine driven under these conditions, is guided into the honeycomb structural body. Then, a PM counter is used for measuring the amount of PM inside the exhaust gas before flowing into the honeycomb structural body (P0) and the amount of PM inside the exhaust gas after passing through the honeycomb structural body (P1). Based on the measured results, the collection efficiency is obtained by calculating:

collection efficiency (%)=(P0−P1)/P0×100.

It is to be noted that the evaluation test is conducted based on the value of the initial collection efficiency (collection efficiency obtained immediately after guiding exhaust gas into a brand new honeycomb structural body or a relatively new honeycomb structural body).

The results are shown in Table 2. The honeycomb structural bodies of Examples 1-16 exhibit a satisfactory collection efficiency of 90% or more. Meanwhile, the honeycomb structural bodies of Comparative Examples 1-9 exhibit a collection efficiency that is less than 90%.

Accordingly, it is understood that a sharp pore distribution and a satisfactory collection efficiency of the honeycomb structural body can be attained by selecting the pore diameter X of the silicon carbide particles, the pore diameter Z of the honeycomb structural body, and the particle diameter Y of the pore forming material so that X, Z, and Y satisfy the above-described relationships. In addition, the honeycomb structural body of the present invention can be efficiently fabricated at a lower temperature and in less time compared to a conventional method for fabricating a honeycomb structural body. Thus, the honeycomb structural body according to an embodiment of the present invention can be used, for example, as a filter or catalyst carrier for removing particulates and the like contained in exhaust gas.

Further, the present invention is not limited to these embodiments, but variations and modifications may be made without departing from the scope of the present invention.

What is claimed as new and desired to be secured by Letters Patent of the United States is:

1. A method of manufacturing a porous sintered body, the method comprising:
mixing first silicon carbide particles, second silicon carbide particles, and a pore forming material having an average particle diameter Y pm to obtain a molding material, the first silicon carbide particles having an average particle diameter X μm larger than an average particle diameter of the second silicon carbide particles, relationships $15 \leq X$, $0.5 \cdot X \leq Z \leq 0.9 \cdot X$, and $0.8 \cdot Z \leq Y \leq 1.8 \cdot Z$ being satisfied, wherein Z μm is an average pore diameter of the porous sintered body no less than 10 μm and no greater than 20 μm;
molding the molding material into a molded body; and
degreasing the molded body to eliminate the pore forming material from the molded body.

2. The method of manufacturing a porous sintered body according to claim 1, further comprising:
sintering the degreased molded body to form a porous sintered body.

3. The method of manufacturing a porous sintered body according to claim 2, further comprising:
providing a catalyst on the porous sintered body.

4. The method of manufacturing a porous sintered body according to claim 3, further comprising:
providing a catalyst carrying layer on the porous sintered body before providing the catalyst.

5. The method of manufacturing a porous sintered body according to claim 4, wherein an oxide ceramic material is used as the catalyst carrying layer.

6. The method of manufacturing a porous sintered body according to claim 5, wherein at least one of alumina, titania, zirconia, silica, and ceria is used as the catalyst carrying layer.

7. The method of manufacturing a porous sintered body according to claim 1, wherein the molding material is molded into a molded body having a honeycomb structure.

8. The method of manufacturing a porous sintered body according to claim 7, wherein the honeycomb structure has a plurality of cells partitioned by cell walls extending in a longitudinal direction of the honeycomb structure.

9. The method of manufacturing a porous sintered body according to claim 1, wherein the porous sintered body is provided with porosity of 45% to 60%.

10. The method of manufacturing a porous sintered body according to claim 1, wherein a synthetic resin is used as the pore forming material.

11. The method of manufacturing a porous sintered body according to claim 10, wherein an acrylic material is used as the synthetic resin.

12. The method of manufacturing a porous sintered body according to claim 1, wherein an organic polymer material is used as the pore forming material.

13. The method of manufacturing a porous sintered body according to claim 12, wherein a starch material is used as the organic polymer material.

14. The method of manufacturing a porous sintered body according to claim 1, wherein the first silicon carbide particles have the average particle diameter X of 15 μm to 40μm, and the second silicon carbide particles have the average particle diameter of 0.5 μm to 1.0 μm.

15. A porous sintered body comprising:
a body made by molding a molding material which comprises:
a pore forming material having an average particle diameter Y μm;
first silicon carbide particles having an average particle diameter X;
second silicon carbide particles having an average particle diameter smaller than the average particle diameter X; and
relationships $15 \leq X$, $0.5 \cdot X \leq Z \leq 0.9 \cdot X$, and $0.8 \cdot Z \leq Y \leq 1.8 \cdot Z$ being satisfied, wherein Z pm is an average pore diameter of the porous sintered body no less than 10 μm and no greater than 20 μm.

16. A method of manufacturing an exhaust gas purifying apparatus, the method comprising:
mixing first silicon carbide particles, second silicon carbide particles, and a pore forming material having an average particle diameter Y μm to obtain a molding material, the first silicon carbide particles having an average particle diameter X μm larger than an average particle diameter of the second silicon carbide particles, relationships $15 \leq X$, $0.5 \cdot X \leq Z \leq 0.9 \cdot X$, and $0.8 \cdot Z \leq Y \leq 1.8 \cdot Z$ being satisfied, wherein $Z$ μm is an average pore diameter of the porous sintered body no less than 10 μm and no greater than 20 μm;

molding the molding material into a molded body;

degreasing the molded body to eliminate the pore forming material from the molded body;

sintering the degreased molded body to form a porous sintered body; and providing the porous sintered body in a casing of the exhaust gas purifying apparatus.

* * * * *